United States Patent
Elbracht

(10) Patent No.: US 10,000,050 B2
(45) Date of Patent: Jun. 19, 2018

(54) METHOD FOR THE MANUFACTURE OF A FIBRE COMPOSITE COMPONENT, A REINFORCEMENT ELEMENT AND ALSO A FIBRE COMPOSITE COMPONENT

(75) Inventor: Dirk Elbracht, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 1219 days.

(21) Appl. No.: 14/110,368

(22) PCT Filed: Apr. 3, 2012

(86) PCT No.: PCT/EP2012/056084
§ 371 (c)(1),
(2), (4) Date: Dec. 17, 2013

(87) PCT Pub. No.: WO2012/136661
PCT Pub. Date: Oct. 11, 2012

(65) Prior Publication Data
US 2014/0113101 A1    Apr. 24, 2014

Related U.S. Application Data

(60) Provisional application No. 61/472,640, filed on Apr. 7, 2011.

(30) Foreign Application Priority Data

Apr. 7, 2011  (DE) .................. 10 2011 006 977

(51) Int. Cl.
*B32B 38/10* (2006.01)
*B29C 70/24* (2006.01)
(Continued)

(52) U.S. Cl.
CPC .............. *B32B 38/10* (2013.01); *B29C 70/24* (2013.01); *B29C 70/86* (2013.01); *B29D 99/001* (2013.01);
(Continued)

(58) Field of Classification Search
CPC ..... B29C 37/0082; B29C 70/24; B29C 70/86; B29C 66/0224; B64C 1/12; B29D 99/001; B29D 99/0014; B32B 37/18; B32B 38/10
See application file for complete search history.

(56) References Cited

U.S. PATENT DOCUMENTS

| 4,811,540 A | 3/1989 | Kallies et al. |
| 4,909,655 A | 3/1990 | Anderson |
| 5,484,277 A * | 1/1996 | Lindsay ................. B29C 70/44 249/134 |
| 7,205,066 B1 | 4/2007 | Hammi et al. |

(Continued)

FOREIGN PATENT DOCUMENTS

| DE | 60207191 | 8/2006 |
| DE | 60210491 | 12/2006 |

(Continued)

OTHER PUBLICATIONS

German Search Report, dated Nov. 21, 2011.
International Search Report, dated Sep. 10, 2012.

*Primary Examiner* — John Goff
(74) *Attorney, Agent, or Firm* — Greer, Burns & Crain Ltd.

(57) ABSTRACT

A method for the manufacture of a fiber composite component with a base element, and with at least one ancillary element bonded to the base element. A reinforcement element is introduced in at least one bonding region of the base element or the ancillary element for purposes of developing a bonding surface for the ancillary element or the base element. A reinforcement element with fiber sections, the ends of which emanate from a bonding surface is provided. A fiber composite component is provided with a base element, in the bonding regions of which reinforcement elements are introduced, on the bonding surfaces of which ancillary elements are bonded with one such.

3 Claims, 4 Drawing Sheets

(51) Int. Cl.
  *B29D 99/00* (2010.01)
  *B64C 1/12* (2006.01)
  *B29C 70/86* (2006.01)
  *B32B 5/12* (2006.01)
  *B32B 7/04* (2006.01)
  *B29K 105/24* (2006.01)
  *B29L 31/30* (2006.01)
  *B64C 1/00* (2006.01)

(52) U.S. Cl.
  CPC ............ *B29D 99/0014* (2013.01); *B32B 5/12* (2013.01); *B32B 7/04* (2013.01); *B64C 1/12* (2013.01); *B29K 2105/24* (2013.01); *B29K 2105/246* (2013.01); *B29L 2031/3082* (2013.01); *B29L 2031/3085* (2013.01); *B64C 2001/0072* (2013.01); *Y02T 50/433* (2013.01); *Y10T 428/23914* (2015.04)

(56) References Cited

U.S. PATENT DOCUMENTS

| | | |
|---|---|---|
| 2003/0037867 A1 | 2/2003 | Bersuch et al. |
| 2008/0160248 A1* | 7/2008 | Jacobsen ............ B29C 37/0082 428/113 |
| 2010/0116938 A1* | 5/2010 | Kline .................. B29C 65/5042 244/131 |
| 2010/0147460 A1* | 6/2010 | Lefebure ................ B29C 65/02 156/307.1 |

FOREIGN PATENT DOCUMENTS

| | | | | |
|---|---|---|---|---|
| EP | 0248161 | 12/1987 | | |
| EP | 1365081 | 11/2003 | | |
| FR | 2718074 | 10/1995 | | |
| WO | 2006069581 | 7/2006 | | |
| WO | WO-2008071657 A1 * | 6/2008 | ............ | B29C 65/02 |

* cited by examiner

METHOD FOR THE MANUFACTURE OF A FIBRE COMPOSITE COMPONENT, A REINFORCEMENT ELEMENT AND ALSO A FIBRE COMPOSITE COMPONENT

CROSS-REFERENCES TO RELATED APPLICATIONS

This application claims the benefit of the U.S. Provisional Application No. 61/472,640, filed on Apr. 7, 2011, and of the German patent application No. 10 2011 006 977.1 filed on Apr. 7, 2011, the entire disclosures of which are incorporated herein by way of reference.

BACKGROUND OF THE INVENTION

The invention concerns a method for the manufacture of a fibre composite component, a reinforcement element for purposes of developing a bonding surface, and also a fibre composite component manufactured in accordance with such a method.

Shell components (e.g. fuselage and wing shells) of aircraft are composed as a rule from a shell-type skin field and from longitudinal stiffeners. The longitudinal stiffeners or ancillary elements are extensively bonded to the skin field or base element, and transport mainly axial loads. The skin field transports primarily shear loads, wherein by means of the extensive bonding of the longitudinal stiffeners the skin field is subdivided into a multiplicity of small shear fields. In the case of fuselage shells of a metallic form of construction the longitudinal stiffeners are often riveted or welded to the skin field. In the case of fuselage shells of a fibre composite form of construction, in a variant of known art prefabricated longitudinal stiffeners are laid in as cured elements during the manufacturing process of the skin field. In an alternative variant of known art the longitudinal stiffeners are adhesively bonded as wet elements onto the cured skin field. For purposes of supporting the adhesively bonded joint, and/or in the event of a separation of the adhesively bonded joint to prevent a propagation of a delamination, the longitudinal stiffeners are, at least in the region of their end run-outs, additionally riveted to the skin field. Moreover the longitudinal stiffeners can be riveted to the skin field in individual regions between their run-outs, in order to improve the resistance of the skin field to buckling. However, the rivets increase the assembly costs and the weight of the fuselage shell. In particular the rivet holes must be machined very precisely in order to prevent a weakening of the fibrous material receiving the rivet holes. Moreover attention must be paid to the material of the rivet, in order to prevent corrosion in the event of contact of the rivets with, for example, carbon fibres of the longitudinal stiffeners or the skin field.

SUMMARY OF THE INVENTION

The object of the invention is to create a method for the manufacture of a fibre composite component, which enables an improved adhesive bonded joint and/or bonding of at least one ancillary element to a base element. Furthermore it is the object of the invention to form a reinforcement element for purposes of developing a bonding surface for the at least one ancillary element, and also to create a fibre composite component that can be subjected to high loads.

In an inventive method for the manufacture of at least one fibre composite component with a base element and with at least one ancillary element connected to the base element, a preform of the base element is firstly prepared with at least one surface bonding region. A fibre composite type of reinforcement element with a bonding surface for purposes of bonding an ancillary element is then positioned in the bonding region. After that the reinforcement element is integrated into the base element preform by the partial covering or overlapping of the reinforcement element with fibre layers of the base element preform. The base element preform, populated with the reinforcement element, is then cured. After that a preform of the ancillary element in the wet state is positioned on the base element on the bonding surface, and cured.

The integration of the bonding surface into a separate reinforcement element enables an individual adjustment of the bonding surface independently of the base element. The reinforcement element can consist of separate materials and can have fibre orientations that allow an optimal introduction of force from the ancillary element into the base element and an optimal materially bonded bonding of the ancillary element. Thereby, by the covering or splicing in of the reinforcement element in some sections, an extensive joint is created between the base element and the reinforcement element. By means of the arrangement of the ancillary element in the wet state on the bonding surface a particularly intimate joint is created between the bonding surface and the ancillary element, such that the ancillary element is connected via the reinforcement element to the base element such that it can accommodate high loads. Furthermore the inventive method can be integrated into the existing production process for the base element, without by this means increasing the number of process steps.

In one example of embodiment the at least one reinforcement element is cured before it is positioned in the bonding region. By this means ease of manipulation and mounting of the reinforcement element is possible.

In one preferred example of embodiment a preform of the at least one reinforcement element is cured together with the base element preform, as a result of which a joint is created between the reinforcement element and the preform that is particularly able to accommodate loads. For this purpose the reinforcement element can consist of dry fibres, which are just connected with one another by means of a thermoplastic binder.

The bonding surface is preferably prepared by a removal of material from the surface of the at least one reinforcement element such that after the removal of material fibres of the reinforcement element emanate from the bonding surface. During the adhesive bonding with the ancillary element the fibres emanating from the bonding surface effect a mechanical anchorage across the adhesively bonded layer, as a result of which an improvement of the strength of the adhesively bonded joint is achieved, since this now takes a mechanical form of a material bond quasi on the fibre plane. In particular the damage tolerance of the adhesive joint is improved, since a failure can only take place from fibre to fibre and thereby much more energy is expended than is the case with a normal adhesive joint. In a quasi-quantitative manner a new form of damage behaviour is created, since any rapid propagation of damage is prevented. The fibre sections can in principle run orthogonally and also at an angle to the bonding surface, i.e. to the plane of the joint. The fibre sections can also be spliced at their ends, or in a similar manner to a Velcro fastening, can have a hooked or a curved section. They preferably have a length such that they securely bridge over the plane of the joint and can penetrate into the ancillary element. The removal of materiel can take place by means of a laser, by means of whose local introduction of heat fibre layers of the reinforcement element located further below the surface are not subjected to loading and the removal of material can take place in a highly precise manner.

An inventive reinforcement element, for use in an inventive method for the manufacture of a fibre composite component, has a multiplicity of fibre layers, at least one body section to be overlapped with fibre material of a base element, and a bonding surface for purposes of bonding an ancillary element, wherein the ends of fibre sections emanate from the bonding surface.

Such a reinforcement element allows an optimal bonding of the ancillary element to the base element, since by means of the at least one overlap a very harmonious integration of the reinforcement element into the base element is possible, aligned with the force distribution, and as a result of the fibre sections protruding above the bonding surface, and thus above the plane of the joint, a mechanical intermeshing can take place between the reinforcement element and the ancillary element. The inventive solution is therefore particularly suitable for an arrangement in highly loaded regions such as in the case of run-outs of longitudinal stiffeners in aircraft construction, and in regions in which local effects such as buckling are conventionally to be anticipated.

Moreover the propagation of delaminations is prevented in the bonding region by means of the reinforcement element.

For the further optimisation of the integration of the reinforcement element into the base element this can have a multiplicity of body sections to be overlapped with fibre material of the base element; these extend in a star shape from the bonding surface.

For improvement of the load-bearing capacity of the reinforcement element and/or for optimisation of the force distribution at least some fibre layers can have differing fibre orientations.

In particular it is preferred if some fibres of the reinforcement element are developed as continuous fibres with fibre sections extending in the direction transverse to the fibre layers and/or in the thickness direction of the base element, since the fibre sections, by the severing of their curved sections, which in each case connect with one another, can easily be transferred into the fibre sections whose ends are emanating from the bonding surface.

The reinforcement element preferably has at least one fibre layer to be removed in the region of the bonding surface. In particular a plurality of fibre layers that are to be removed can provide compensation for component and assembly tolerances. Just one fibre layer represents an effective protection of the fibre layer forming the respective bonding surface.

For the purpose of undertaking a visual check as to whether the bonding surface is sufficiently prepared, the at least one fibre layer that is to be removed can be marked. What is conceivable, for example, is a colouring of the fibre layers that are to be removed.

For the purpose of undertaking a visual check as to whether the bonding surface is sufficiently prepared, a fibre layer that in each case is to be removed can be marked.

An inventive fibre composite component has a base element with a multiplicity of bonding regions, a multiplicity of fibre composite-type reinforcement elements arranged in the bonding regions, and a multiplicity of ancillary elements, which in each case are bonded to a bonding surface of the reinforcement elements.

Such a fibre composite component is distinguished by a bonded joint that can be subjected to high loads and is damage-tolerant, such that the conventional means of mechanical attachment can be dispensed with to a considerable extent.

In one preferred example of embodiment the fibre composite component is a stiffened shell component of an aircraft with a skin field as the base element and longitudinal stiffeners as the ancillary elements, wherein in the region of run-outs of the longitudinal stiffeners a reinforcement element is in each case integrated into the base element.

Other advantageous examples of embodiment of the invention are the subject of further subsidiary claims.

BRIEF DESCRIPTION OF THE DRAWINGS

In what follows a preferred example of embodiment of the invention is elucidated in more detail with the aid of greatly simplified schematic representations. Here.

DETAILED DESCRIPTION OF THE PREFERRED EMBODIMENTS

Figure 1:
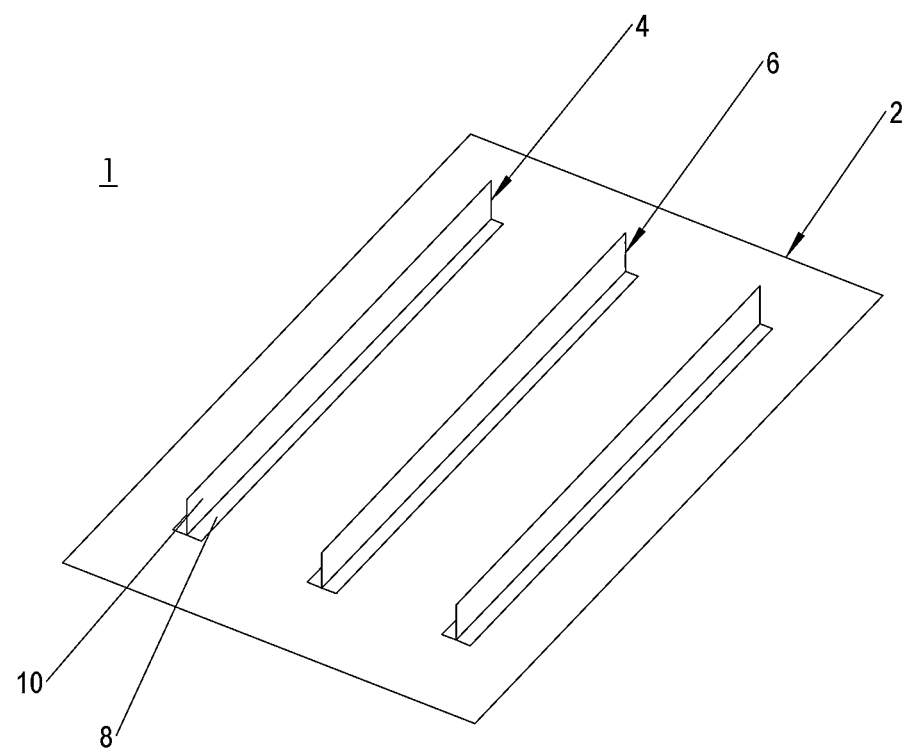
FIG. 1 shows a perspective representation of an inventive fibre composite component.

FIG. 1 shows an inventive fibre composite component 1, with a base element 2, to which a multiplicity of ancillary elements 4, 6 are connected. The fibre composite component 1 is, for example, a shell component, in particular a fuselage shell of an aircraft fuselage, with a skin field, which is stiffened by means of longitudinal stiffeners or stringers, wherein the ancillary elements 4, 6 represent the stringers, and the base element 2 represents the skin field.

The base element 2 is a shell-type fibre composite element and consists preferably of a multiplicity of fibre webs, which in a laying process such as ATL (Automatic Tape Laying) or FPL (Fibre Placement Laying) have been laid down on a mould surface, not shown, in a plurality of layers and orientations. The fibre webs consist of carbon fibre mats arranged in a thermosetting or thermoplastic resin matrix and are preferably so-called prepregs. Alternatively, however, fibre mats of glass fibres, aramide fibres and similar can also be used.

The ancillary elements 4, 6 have, for example, in each case a T-shape cross-section with a foot section 8 and a web section 10 extending centrally from the foot section 8. They are developed in each case as a fibre composite element with a plastic matrix and a multiplicity of fibres arranged in the plastic matrix. The fibres are preferably carbon fibres, glass fibres, aramide fibres and similar. The plastic matrix preferably consists of a thermosetting plastic. However, it can also have a thermoplastic base.

Figure 2:
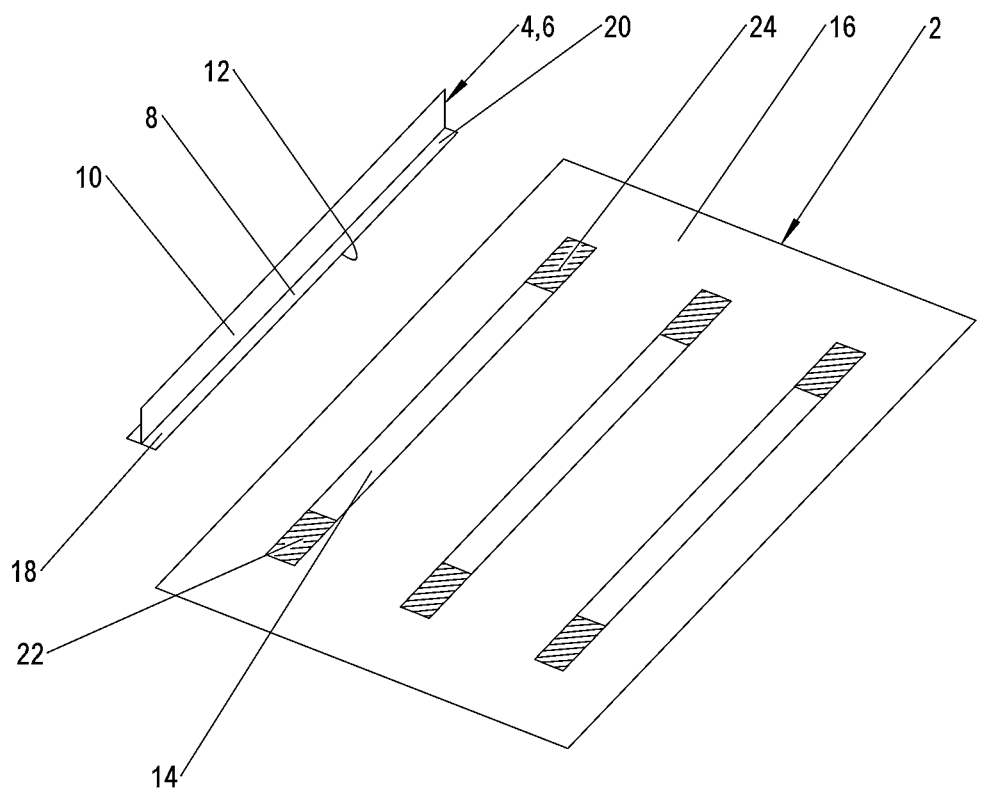
FIG. 2 shows individual elements of the fibre composite component.

The ancillary elements 4, 6 with their respective foot sections 8 are materially bonded to the base element 2 by means of an adhesive joint forming the fibre composite component 1 with the joining of the ancillary elements 4, 6 to the base element 2. For this purpose they have, as shown in FIG. 2, a foot surface 12 in each case extending across the foot section 8; the foot surface 12 is adhesively bonded with a section 14 of a surface 16 of the base element 2. For purposes of improving the static and dynamic strength of the adhesive joint as well as for purposes of improving damage behaviour bonding surfaces 22, 24, represented in a hatched manner and separately developed, are provided, at least in the regions of the section 14 in which the ancillary elements 4, 6 with their run-outs, i.e. with their end sections 18, 20 are arranged, for purposes of bonding the ancillary elements 4, 6.

Figure 3:
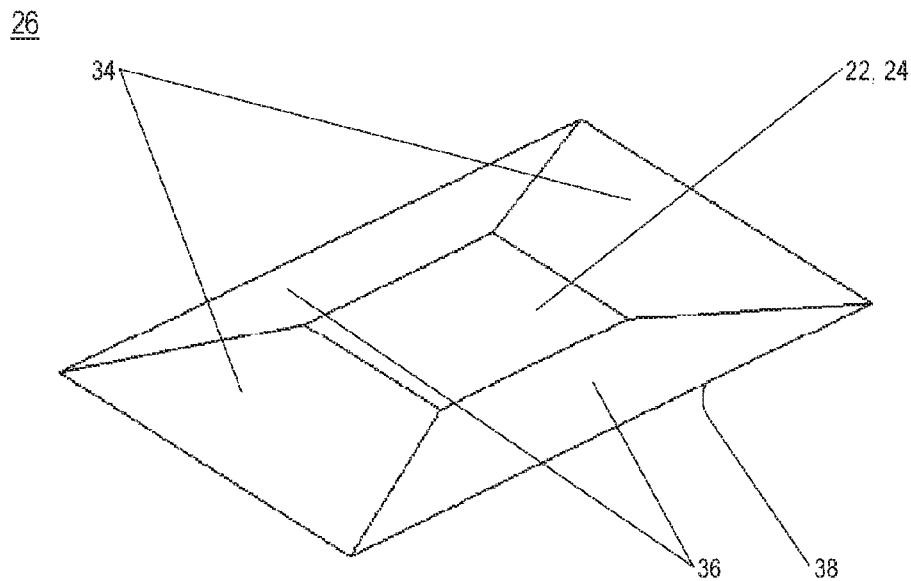
FIG. 3 shows a perspective representation of an inventive reinforcement element.

The bonding surfaces 22, 24 are in each case formed from a separate reinforcement element 26, represented in FIG. 3, which is integrally joined with the base element 2, i.e. is integrated into the latter. The reinforcement element 26 is developed as a fibre composite from a multiplicity of fibre layers/lays 28, 30, 32 arranged in layers (see FIG. 4), preferably with differing orientations. The fibre layers 28, 30, 32 are preferably formed in each case in the form of mats from a multiplicity of carbon fibres, glass fibres, aramide fibres and similar. They are arranged relative to one another such that the reinforcement element 26 has an approximately trapezoidal longitudinal and transverse section with wedge-type body sections 34, 36 that are facing away from one another, which transition into one another at their edges, and between whose wedge surfaces the bonding surface 22, 24 is arranged. In the example of embodiment shown the reinforcement element 26 has a greater extent in the longitudinal direction than in the transverse direction, as a result of which the bonding surface 22, 24 has a rectangular shape. However, the reinforcement element 26 can also have other dimensional relationships. As measured from a rectangular base surface 38, which in this example of embodiment is facing away from the bonding surface 22, 24, the bonding surface 22, 24 is arranged in the region of the reinforcement element 26 in which the latter has its greatest extent in the thickness direction.

Figure 4:
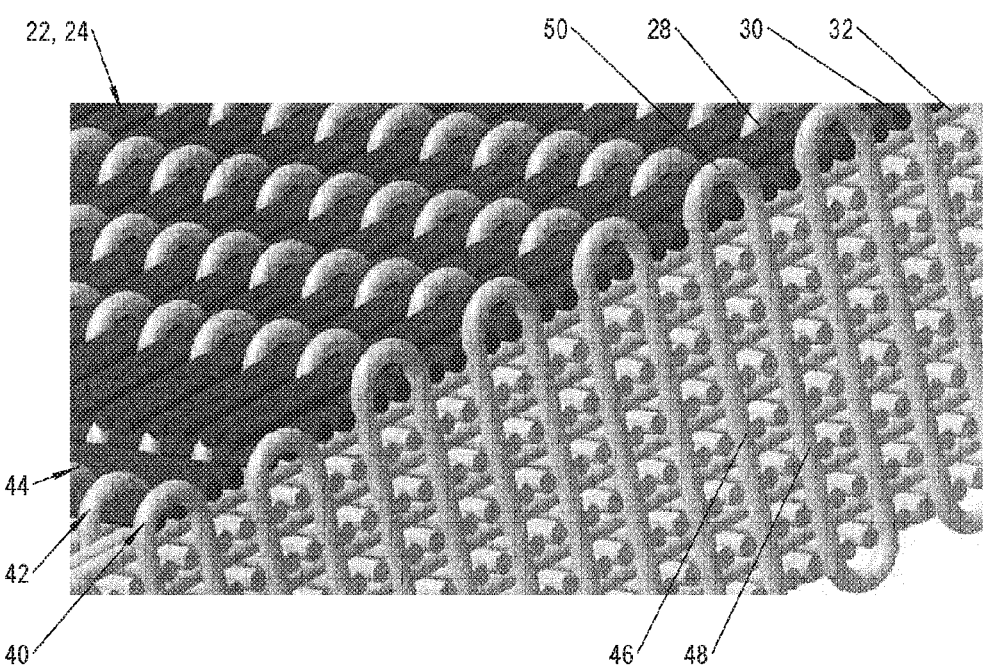
FIG. 4 shows a detailed representation of the reinforcement element.

As shown in FIG. 4, the reinforcement element 26 in the region of the bonding surface 24, i.e. in the region of its greatest thickness extent, in addition has a multiplicity of fibres 40, 42, 44 that are preferably embodied as continuous fibres. The continuous fibres 40, 42, 44 have in each case a multiplicity of fibre sections 46, 48 running in the thickness direction, i.e. the direction transverse to the fibre layers 28, 30, 32; these fibre sections 46, 48 are connected with one another via individual curved sections 50. The curved sections 50 are positioned in the region of the fibre layers 28, 30, which are removed during the preparation of the bonding surface 22, 24 for adhesive bonding. For purposes of identification of the fibre layers 28, 30 to be removed they are marked in a colour, in contrast to the deeper-lying fibre layers 32 in FIG. 4.

Figure 5:
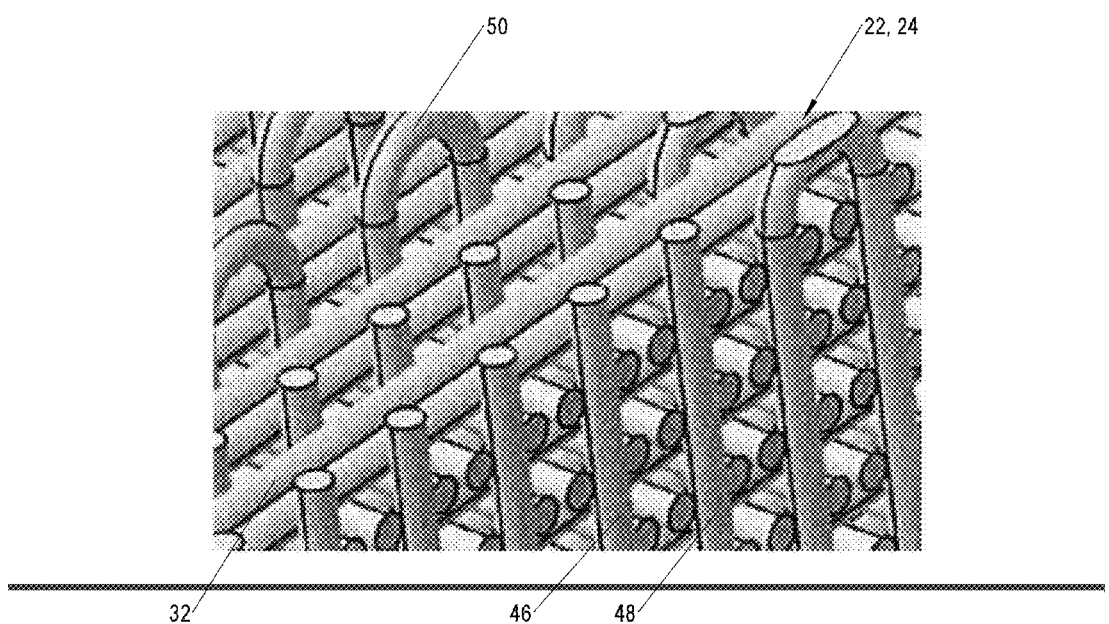
FIG. 5 shows a perspective view of part of a prepared bonding surface of the reinforcement element for purposes of bonding an ancillary element.

As shown in FIG. 5, after the preparation of the bonding surface 22, 24, i.e.

after the removal of the fibre layers 28, 30 and after the severing of the curved sections 50, the previously deeper-lying fibre layer 32 forms the outer fibre layer. Moreover as a result of the severing of the curved sections 50 the fibre sections 46, 48 individually protrude above the fibre layer 32 and thus their ends protrude out of the bonding surface 22, 24.

Figure 6:
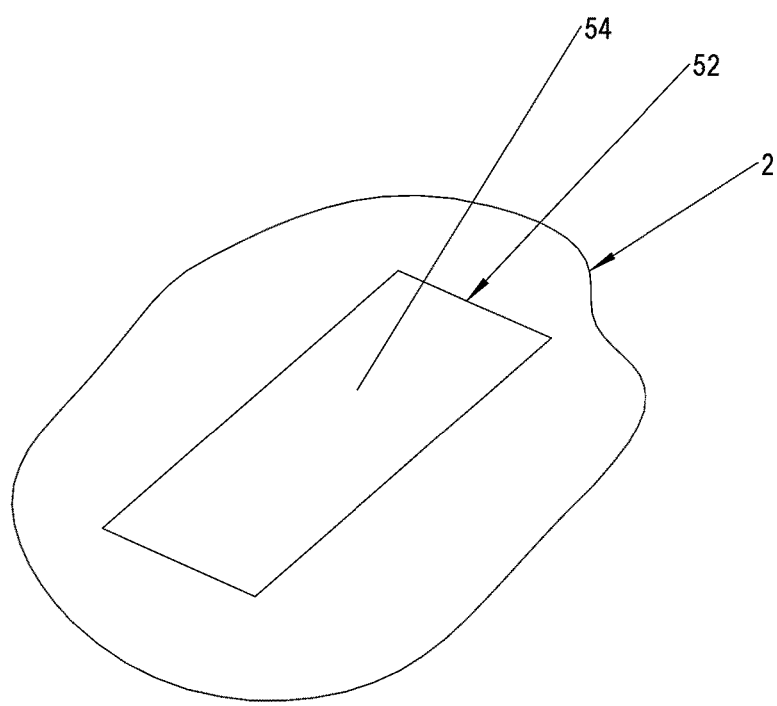
FIG. 6 shows a section from a base element of the fibre composite component with a bonding region for purposes of accommodating the reinforcement element.

As shown in FIG. 6 in a part section, the base element 2 for purposes of accommodating the reinforcement elements 26 has a multiplicity of bonding regions 52, whose respective individual surfaces 54 correspond to the base surface 38 of the respective reinforcement element 26.

Figure 7:
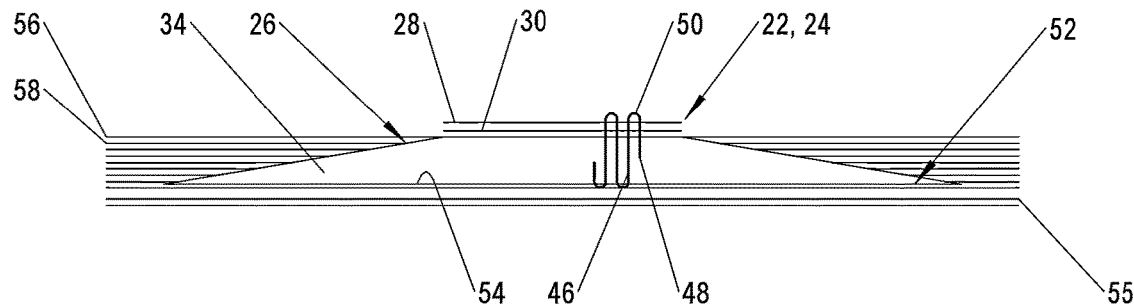
FIG. 7 shows a section through the fibre composite component in the region of the at least one reinforcement element in the region of its bonding surface.

In what follows preferred methods for the manufacture of the fibre composite component are elucidated:

As shown in FIG. 7, to begin with a preform of the base element 2 is developed by the laying down by layers of dry or pre-impregnated fibre webs 55 on a mould surface. The bonding regions 52 are then defined. Here the bonding regions 52 are in each case provided in pairs such that the distance between the bonding regions 26 of a pair corresponds in each case to the distance between the end sections 18, 20 of the ancillary elements 4, 6, and such that the lateral distance between two pairs corresponds in each case to a required distance between adjacent ancillary elements 4, 6. After that the reinforcement elements 26 are positioned in the bonding regions 52, i.e. on their individual surfaces 54. The reinforcement elements 26 can be developed in the cured state, or as dry preforms that have simply been wetted with a binder. After the positioning of the reinforcement elements 26 the other layers of the base element preform are laid down, wherein for purposes of integration of the reinforcement elements 26 individual fibre webs 56, 58 of the base element preform are laid over the wedge-type body sections 34, 36 of the reinforcement elements 26. After all the layers have been laid down the base element preform, populated with the reinforcement elements 26, is cured and consolidated to become the base element 2. If the reinforcement elements 26 have been positioned in the bonding regions 26 as dry preforms, these are also impregnated and consolidated during the process of curing the base element preform, such that the fibres of the reinforcement elements 26 and the fibres of the base element 2 are accommodated in a common resin matrix. After the integration of the reinforcement elements 26 into the bonding regions 52, i.e. after the laying down of the fibre webs 56, 58, the reinforcement elements 24 in the region of the bonding surfaces 22, 24 protrude above the surrounding surface sections of the base element 2 by the number of fibre layers 28, 30 that are removed during the development of the bonding surfaces 22, 24.

Figure 8:
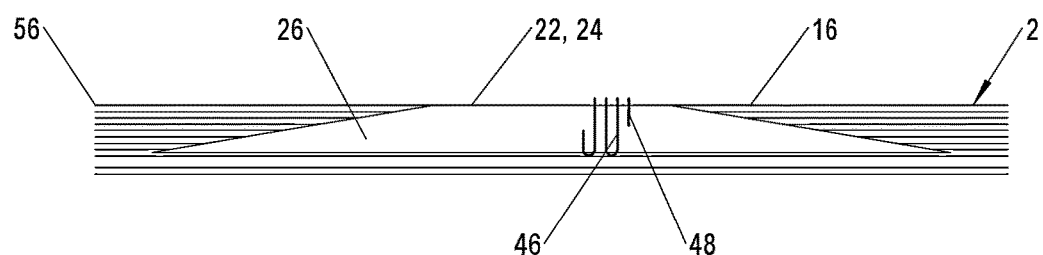
FIG. 8 shows a section through the fibre composite component in the region of the at least one reinforcement element with a developed bonding surface.

After the consolidation of the base element 2 populated with the reinforcement elements 26, the bonding surfaces 22, 24 of the reinforcement elements 26, as shown in FIG. 8, are prepared for the bonding of the ancillary elements 4, 6. Here the reinforcement elements 26 in the region of the bonding surfaces 22, 24 are quasi-levelled such that the prepared bonding surfaces 22, 24 transition into the surrounding surface sections in a stepless manner, and with the outer fibre layers 56 form a plane and continuous surface 16. For this purpose the fibre layers 28, 30 protruding above the surrounding surface sections are removed over the surface area and the bond-side curved sections 50 of the fibre sections 46, 48 running in the thickness direction are removed, such that they are exposed and their ends emanate from the bonding surface 22, 24 (see also FIG. 5). The preparation of the bonding surfaces 22, 24 is preferably undertaken by means of electromagnetic radiation such as laser radiation.

After the preparation of the bonding surfaces 22, 24 wet, resin-impregnated preforms of the ancillary elements 4, 6 with their end sections 18, 20 are positioned on the bonding surfaces 22, 24.

Finally the structure is forwarded to an autoclave process, in which the resin matrix of the ancillary element preforms is firstly fluidised, by the introduction of heat, and then cured. Here the ends of the ancillary element preforms are pressed against the bonding surfaces 22, 24, as a result of the pressure prevailing in the autoclave, such that the freestanding fibre sections 46, 48 orientated at right angles to the plane of the joint are pressed into the ancillary element preforms and thus provide a bridging function over and above that of the adhesive bonded joint. After the autoclave process the ancillary elements 4, 6 are thus not only materially bonded with the base element 2, and with the reinforcement elements 26, but in accordance with the invention are also mechanically intermeshed with at least the reinforcement elements 26 via the fibre sections 46, 48 emanating from the bonding surface 22, 24 and protruding above the plane of the joint.

Disclosed is a method for the manufacture of a fibre composite component with a base element, and with at least one ancillary element bonded to the base element, wherein a reinforcement element is introduced in at least one bonding region of the base element or the ancillary element for purposes of developing a bonding surface for the ancillary element or the base element, a reinforcement element with fibre sections, the ends of which emanate from a bonding surface, also a fibre composite component with a base element, in the bonding regions of which reinforcement elements are introduced, on the bonding surfaces of which ancillary elements are bonded with one such.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

REFERENCE SYMBOL LIST

1 Fibre composite component
2 Base element
4 Ancillary element
6 Ancillary element
8 Foot section
10 Web section
12 Foot surface
14 Surface section
16 Surface
18 End section
20 End section
22 Bonding surface
24 Bonding surface
28 Fibre layer
30 Fibre layer
32 Fibre layer
34 Body section
36 Body section
38 Base surface
40 Fibre
42 Fibre
44 Fibre
46 Fibre section
48 Fibre section
50 Curved section
52 Bonding region
54 Individual surface
55 Fibre layer
56 Fibre material
58 Fibre material

The invention claimed is:

1. A method for the manufacture of a fibre composite component, with a base element, and with at least one ancillary element connected to the base element, comprising the steps:
   preparing a preform of the base element with at least one surface bonding region,
   positioning at least one reinforcement element, with a bonding surface for purposes of bonding the ancillary element in the bonding region of the base element perform and
   integrating the at least one reinforcement element into the base element preform by positioning the at least one reinforcement element on a central fibre layer of the base element perform and then partially overlapping of the reinforcement element with outer fibre layers of the base element preform,
   curing the base element preform populated with the reinforcement element,
   preparing of the bonding surface by a removal of a surface of the at least one reinforcement element, such that after the removal the ends of fibre sections emanate from the bonding surface for mechanical intermeshing with the ancillary element, and such that the bonding surface transitions into surrounding surface sections of the base element in a stepless manner, such that the outer fibre layers and the bonding surface form a plane and a continuous surface,
   positioning a preform of the ancillary element in the wet state on the base element and on the bonding surface, and
   curing the ancillary element preform.

2. The method in accordance with claim 1, wherein the at least one reinforcement element is cured before positioning in the bonding region.

3. The method in accordance with claim 1, wherein a preform of the at least one reinforcement element is cured together with the base element preform.

* * * * *